J. W. COGSWELL.
Pruning Implement.
No. 222,384.      Patented Dec. 9, 1879.
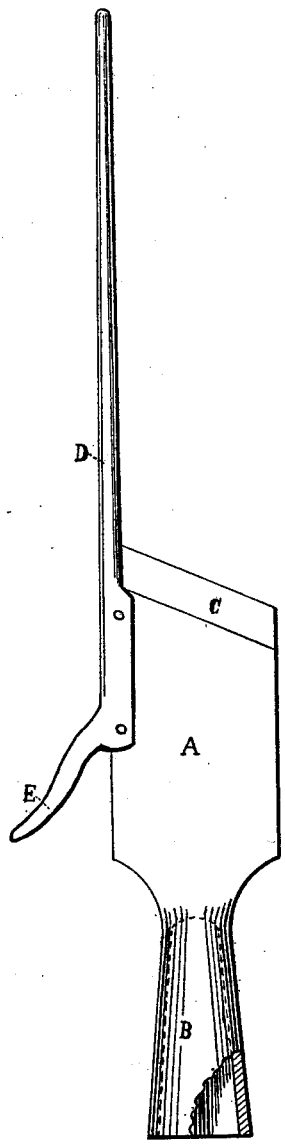
Witnesses:
John Kirkup
William A. Boucher
Inventor:
John W. Cogswell
Per J N Clouse & Co Attys.

UNITED STATES PATENT OFFICE.

JOHN W. COGSWELL, OF ERIE, MICHIGAN.

IMPROVEMENT IN PRUNING IMPLEMENTS.

Specification forming part of Letters Patent No. 222,384, dated December 9, 1879; application filed August 9, 1879.

*To all whom it may concern:*

Be it known that I, JOHN W. COGSWELL, of the town of Erie, in the county of Monroe and State of Michigan, have invented a new and useful Improvement in Pruning Instruments, of which the following is a specification.

The invention relates to all of that class of pruning instruments in which the cutting is performed by bringing the cutting-edge in contact with the limb by means of a sudden blow or stroke.

The object of my invention is to provide an attachable part suitable for all such pruning instruments, which shall serve as a guide to direct the force of the stroke, and also to obtain the full benefit of the stroke, which I claim is not obtained by other devices.

The invention consists in a straight smooth tine or shaft, round or other suitable shape, made of steel or other suitable material, and of a length sufficient to obtain a suitable stroke, the same being forged or welded to or fastened by means of bolts, screws, or rivets to the edge of the cutting-blade, which piece terminates back of the fastening in a projection to be used to pull out the limbs cut off from the tree.

The device may be better understood by reference to the drawing hereto annexed, in which A represents the blade of an ordinary pruning-chisel; B, the socket, to receive a handle; and C, the cutting-edge, shaped into a single bevel or otherwise, as desired. D is the rest or guide, made solid upon or attached by suitable means, as above described, to the edge of the blade A. E is a projection forming a part of the piece D, which forms, when attached to the blade, a hook, with which the limbs cut from the tree may be pulled out.

Having thus described my invention, what I claim as new, and desire to secure by Letters Patent, is—

In a pruning implement, the guide or rest D, having integral therewith a projection, E, which forms a hook when attached to the blade, substantially as and for the purpose set forth.

JOHN W. COGSWELL.

Witnesses:
 JOHN KIRKUP,
 WILLIAM A. BOUCHER.